(12) United States Patent
Blomgren

(10) Patent No.: US 7,117,882 B2
(45) Date of Patent: Oct. 10, 2006

(54) VALVE FOR CHANGING THE DIRECTION OF FLOW OF A FLUID IN PIPE CONDUITS

(75) Inventor: Ralf Erik Blomgren, Skanör (SE)

(73) Assignee: Marinnovation HB, Skanör (SE)

( * ) Notice: Subject to any disclaimer, the term of this patent is extended or adjusted under 35 U.S.C. 154(b) by 70 days.

(21) Appl. No.: 10/522,570

(22) PCT Filed: Jul. 10, 2003

(86) PCT No.: PCT/SE03/01201

§ 371 (c)(1),
(2), (4) Date: Jan. 28, 2005

(87) PCT Pub. No.: WO2004/011834

PCT Pub. Date: Feb. 5, 2004

(65) Prior Publication Data

US 2006/0162781 A1    Jul. 27, 2006

(30) Foreign Application Priority Data

Jul. 31, 2002    (SE)    ................................. 0202344

(51) Int. Cl.
*F16K 11/074*    (2006.01)
(52) U.S. Cl. ................................. 137/311; 137/625.43
(58) Field of Classification Search ................. 137/311, 137/625.43
See application file for complete search history.

(56) References Cited

U.S. PATENT DOCUMENTS

| | | | |
|---|---|---|---|
| 4,445,540 A | 5/1984 | Baron et al. | |
| 4,506,703 A | 3/1985 | Baron | |
| 6,058,974 A * | 5/2000 | Blomgren | ............... 137/625.43 |
| 6,698,452 B1 * | 3/2004 | Sisk et al. | .............. 137/625.43 |
| 2006/0037654 A1 * | 2/2006 | Moreno | ................. 137/625.43 |

FOREIGN PATENT DOCUMENTS

| | | |
|---|---|---|
| DE | 31 47 511 A1 | 6/1983 |
| DE | 37 27 467 A1 | 2/1989 |
| GB | 324239 | 1/1980 |
| SE | 504 895 | 5/1997 |
| WO | WO 98/01688 | 1/1998 |

\* cited by examiner

*Primary Examiner*—Kevin Lee
(74) *Attorney, Agent, or Firm*—Venable LLP; Eric J. Franklin

(57) ABSTRACT

A valve and use of a valve. The valve changes the direction of flow of a fluid in pipings conducting the fluid to and from a heat exchanger. A cylindrical casing and a valve body enclosed therein can be rotated between two positions. The valve body has three flow passages. A fourth flow passage is constituted by the space between the house of the valve and respective walls around the flow passages in the valve body. The entire valve is flushed by the fluid during operation, thereby eliminating the risk for accumulation of dirt in the valve.

7 Claims, 6 Drawing Sheets

VALVE FOR CHANGING THE DIRECTION OF FLOW OF A FLUID IN PIPE CONDUITS

BACKGROUND OF THE INVENTION

The present invention relates to a valve for changing the direction of flow of a fluid in pipe conduits conducting the fluid to and from a heat exchanger, respectively, said valve comprising a rotateable valve body and an enclosing valve house consisting of a cylindrical casing with end plates, wherein said valve body is rotatable around a rotary axis coinciding with a thought centre line of the cylindrical casing, and four flow passages extending through the valve house and being oriented in such a way that two diametrically located flow passages are approximately parallel with the rotary axis of the valve body and that the two other flow passages extend obliquely through the valve house, and, when the valve body is rotated into a first position, the flow passages connect a first connection port in the first end plate with a first connection port in the second end plate, and a second connection port in the first end plate with a second connection port in the second end plate, respectively, and, when the valve body is rotated into a second position, the flow passages connect a first connection port in the first end plate with a second connection port in the second end plate and a second connection port in the first end plate with a first connection port in the second end plate, respectively.

Heat exchangers used in systems in which cooling water is taken from natural water streams, river water, seawater etc. often show problems with clogging. Partly, it may depend on mud and particles jamming the cooling channels and partly on biological growth.

A simple and environmentally harmless way to keep a heat exchanger tolerably clean is to back flush the heat exchanger regularly, i.e. the direction of flow is reversed for example one or a few times each day. By reversing the direction of flow, mud and particles clogging the inlet region of the heat exchanger will be flushed out the same way it came in.

Back flushing of heat exchangers is also used to in some industrial processes in which fluids with large amounts of fibers are present, for example during the production of raw sugar. Fluid with cut down beats is to be heated and cooled in heat exchangers, and in order for the heat exchangers not to be clogged they must be back flushed regularly.

A back flushing valve of a similar kind as the one included by the invention, is previously known from for example SE 504 895, which describes a valve being used together with a heat exchanger to make back flushing possible. This valve consists of a valve house with a cylindrical casing and two end plates, and inside the valve house there is a rotatable valve body, by which the direction of flow can be reversed. The valve body in this valve has four flow passages and in order to keep the size of the valve down at least two of the flow passages have a non circular cross section in the middle portion of the valve body.

SUMMARY OF THE INVENTION

In a preferred embodiment of the valve body, the flow passages are realized as four separate pipes, two of which have a non circular cross section in the middle portion. The shapes of these two pipes are quite complex and demand a complicated and expensive method of production. Special shaping tools, one set for each size, must be produced.

Another difficulty with the known valve according to SE 504 895 is that dirt and particles are collected in the space between the cylindrical casing and the pipes, and if a too large amount is accumulated the rotation of the valve body can be difficult or in the worst case be prevented. In order to secure the rotating function, the valve house has to be drained regularly during operation, which means that the valve house must be provided with a drain connection. Since the valve in most cases is to be operated without manual control, it is demanded that the drain connection is opened and closed by means of a controlled valve, which complicates the installation of the back flushing valve and makes it more expensive.

The purpose of the present invention is to reduce the costs of manufacturing and installation of the back flushing valves considerably, and to achieve a back flushing valve that is simpler to operate than the one according to SE 504 895.

These and other purposes are achieved according to the invention by a valve of the construction initially defined, which has been given the characteristics specified in claim 1. Preferred embodiments of the valve according to the invention have further been given the characteristics defined in claims 2 to 6. The invention also relates to a use of the valve, the use being given, the characteristics defined in claim 7.

BRIEF DESCRIPTION OF THE DRAWINGS

A possible embodiment of the invention is described below with reference to FIGS. 1–13.

DETAILED DESCRIPTION OF THE PREFERRED EMBODIMENTS

Figure 1:
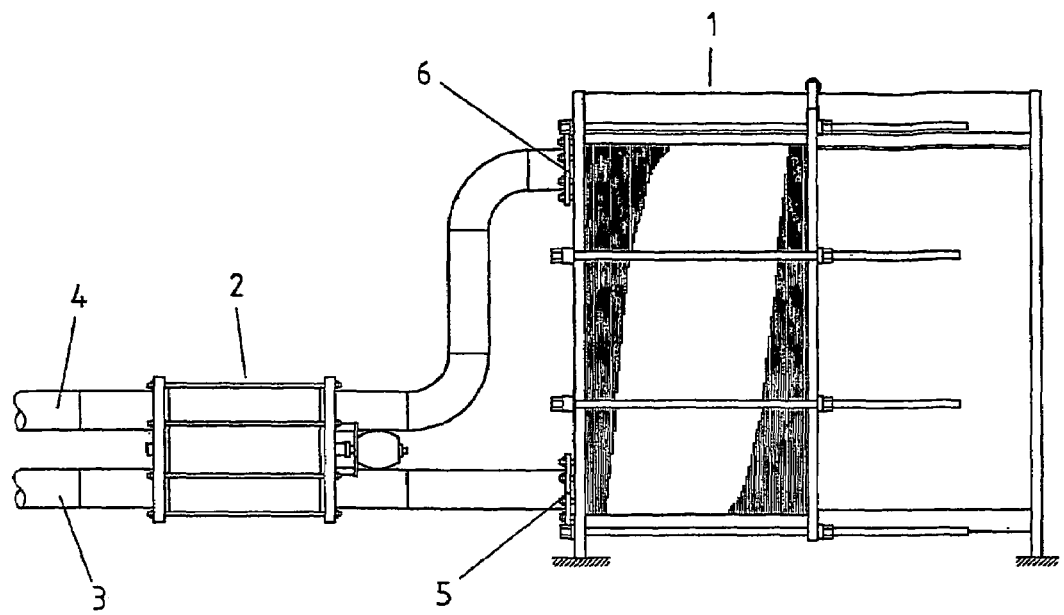
FIG. 1 schematically shows a plate heat exchanger, a back flushing valve and pipe conduits conducting fluid to and from the heat exchanger, respectively.

In FIG. 1 a plate heat exchanger 1 and a back flushing valve 2 being mounted on an inlet and outlet conduit 3 and 4, respectively, is shown. During normal operation the valve body of the back flushing valve is suitably rotated into a first position such that the inlet conduit 3 is connected with the port 5 of the heat exchanger and the outlet conduit 4 with the port 6, via two flow passages in the valve body. During normal operation the port 5 is an inlet port and the port 6 is an outlet port.

During back flushing the valve body is rotated into a second position such that the inlet pipe 3 becomes connected with the port 6, and the outlet pipe 4 with the port 5, which means that the port 6 becomes the inlet port and the port 5 becomes the outlet port. The construction and the function of the back flushing valve is described in greater detail in connection to FIGS. 2–13.

Figure 2:
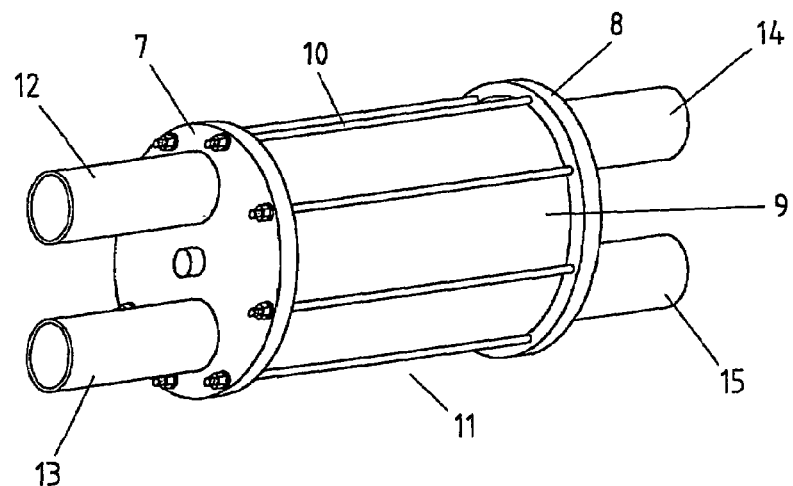
FIG. 2 shows and inclined projection of the back flushing valve.

In FIG. 2 the back flushing valve is shown in an inclined projection. The valve house 11 consists of two plane end plates 7 and 8, respectively, and a casing 9. A screw joint 10 keeps the end plates and the casing together. On both the end plates 7 and 8 there are protruding connection pipes 12, 13, 14 and 15, which are connected to the pipe conduits conducting fluid to and from the heat exchanger, respectively.

Figure 3:
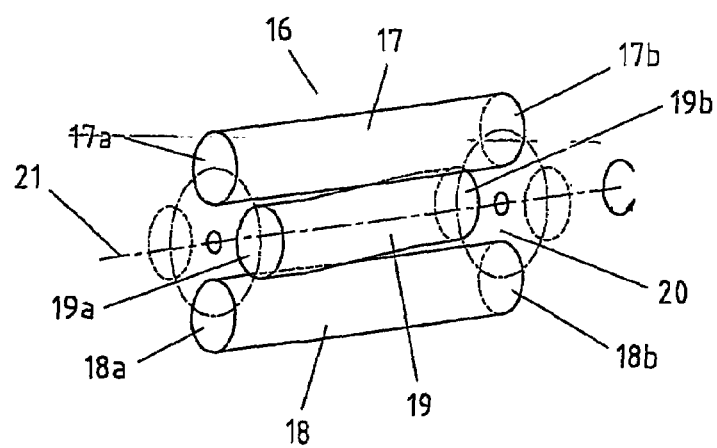
FIG. 3 schematically shows a valve body and a principle for the layout of the flow passages.

In FIG. 3, the valve body 16 is shown schematically in the position it has during normal operation when it is mounted in a valve and oriented as the back flushing valve in FIG. 2. Four flow passages 17–20 extend between the end plates, three of which are tubular and debouche into both ends of the valve body with the openings 17a–19a and 17b–19b, respectively. The flow passage 20 is constituted of the remaining space in the valve house. The openings are placed with a uniform division 900 on the same distance from the rotary axis 21 of the valve body. The flow passages 17 and 18 are approximately parallel with the thought length axis of the valve body, which also constitutes its rotary axis. During normal operation the valve body is suitably rotated such that the flow of fluid passes through the flow passages 17 and 18, so that the back flushing valve does not give rise to a higher pressure drop than pipe conduits with a corresponding length would give.

The flow passage 19 extends obliquely through the valve body in such a way that the openings 19a and 19b in the ends are displaced 180°. If the valve body in FIG. 3 is enclosed in the valve house 11 in FIG. 2, and rotated 90° around its length axis, in such a way that the connection pipe 12 is connected with the connection pipe 15, the connection pipe 13 will be connected with the connection pipe 14. Thus the change of the direction of the fluid, which is the purpose of the invention, is achieved.

Figure 4:
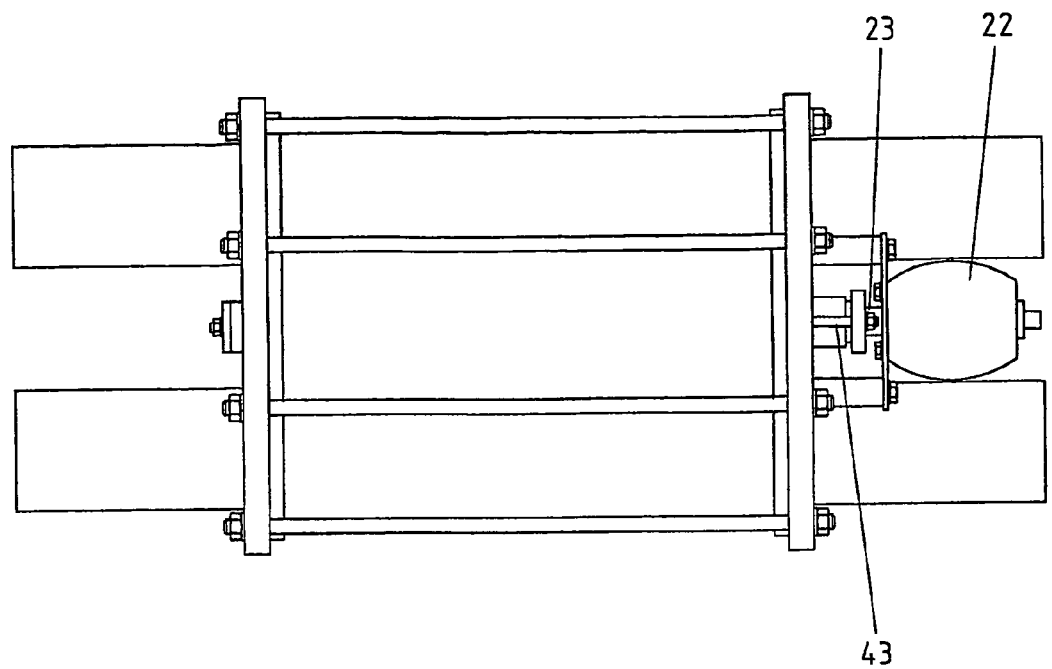
FIG. 4 shows a side view of the back flushing valve.
Figures 5, 6:
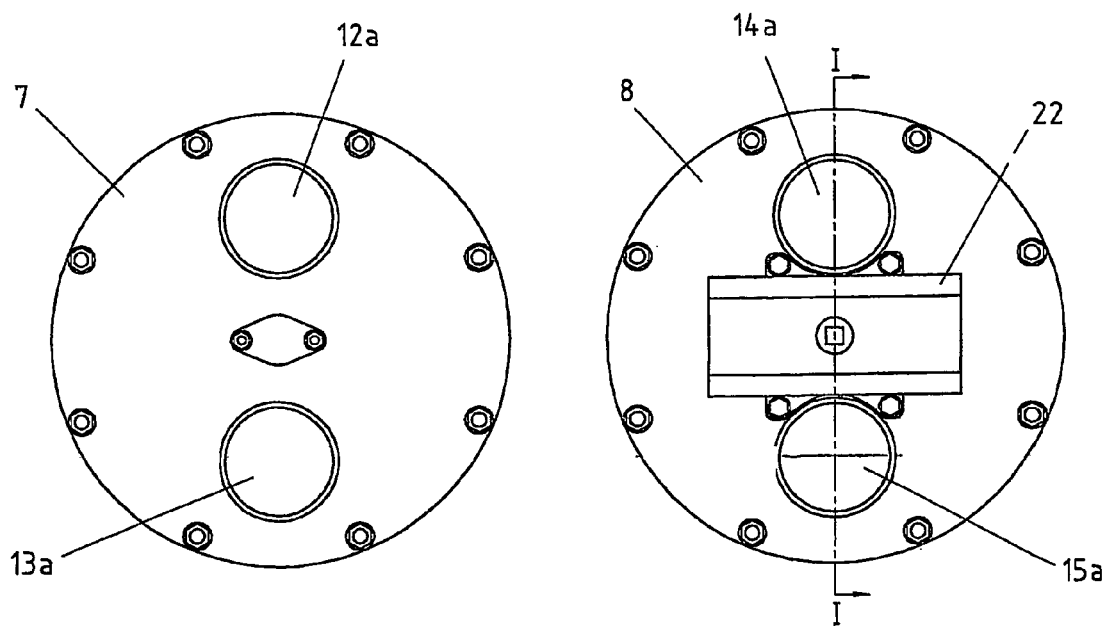
FIG. 5 shows a view of the left end of the back flushing valve in FIG. 4.
FIG. 6 shows a view of the right end of the back flushing valve in FIG. 4.

On one of the end plates there is a control device 22, which appears from the FIGS. 4 and 6. With the help of the control device the valve body can be rotated 90° from a normal position to the back flushing position and vice versa. The rotational motion of the control device is transferred to the valve body through a shaft 23. Different types of control devices can be used, pneumatic, hydraulic and electric. The back flushing valve does not necessarily need to have a control device but may also be rotated manually.

FIGS. 5 and 6 show the two end plates 7 and 8 with the respective connection ports 12a and 13a, and 14a and 15a, respectively, through which the fluid flows to and from the valve house.

Figure 7:
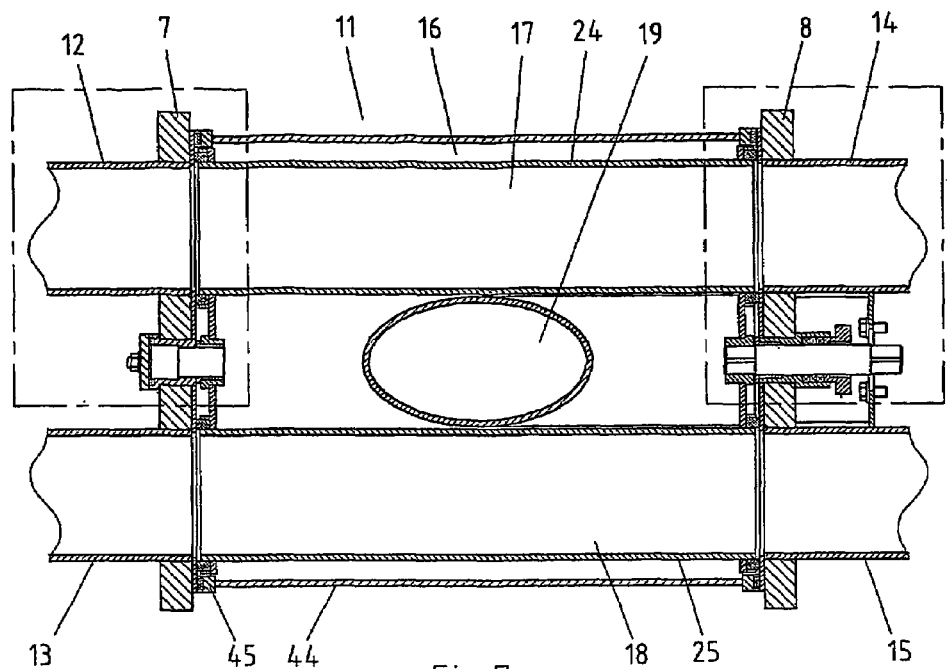
FIG. 7 shows a cross section along the line I—I through the back flushing valve in FIG. 6 with the valve body in a normal position.
Figures 8, 9:
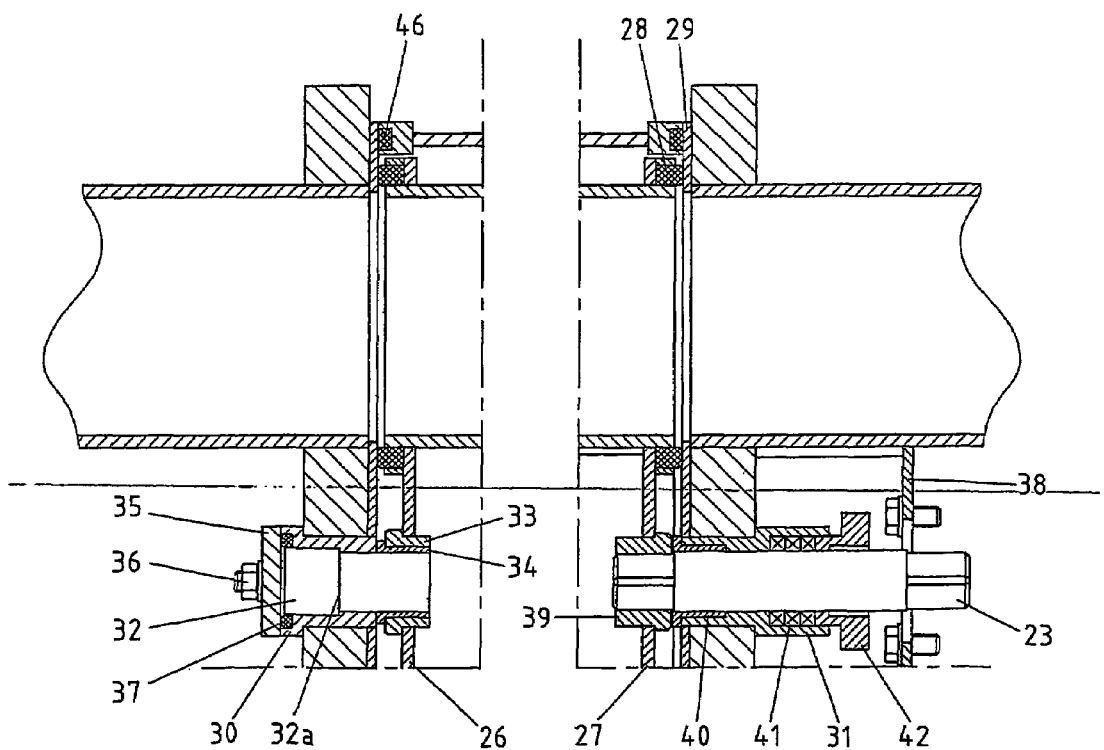
FIGS. 8 and 9 show the marked areas in FIG. 7 scaled up.

From FIGS. 7, 8 and 9, the construction of the back flushing valve is evident in greater detail. In the valve house the valve body 16 is shown with the flow passages 17 and 18, which are limited by the two straight pipes 24 and 25, respectively. The pipes are attached to one end plate 26 and 27 in each end such that these together with the pipes constitute a connected unit rigid to bending and torsion. Around the pipe ends there are sealings 28 minimising the through leakage from the inlet pipe to the outlet pipe. Due to the pressure drop in the heat exchanger a pressure difference arises between the inlet and outlet, and without the sealings a significant portion of the flow would pass through the valve house instead of through the heat exchanger.

The end plates consist of plane, relatively thick rounds of pressure vessel steel. In order to avoid corrosion on the end plates there is a thin sheet 29 of material resistant to corrosion on the inside of the respective end plate. In each end plate there are two connection pipes 12 and 13, and 14 and 15, respectively, and these are joined with the respective sheet 29 by for example welding, such that pressure-tight joints are achieved. In the centre of each end plate there is a sleeve 30 and 31, respectively, which are also pressure-tightly joined to the sheet 29.

A shaft 32 extends through the sleeve 30 into a hub 33 located in the centre of the end plate 26, and the valve body may rotate around the shaft. The hub 33 is provided with a bearing 34, in order to decrease the friction resistance and the wear. The shaft is shaped with a larger outer portion and the shoulder 32a thus produced fixes the position of the shaft together with the cap 35. The cap is attached with a screw joint 36, and a gasket 37 is provided between the cap and the sleeve, which gasket prevents the medium in the valve house from leaking.

The rotation device 22 is mounted on an attachment sheet 38 on the end plate 8; however, the rotation device is not shown in FIG. 7. The shaft 23 transferring the rotational motion from the rotation device to the valve body is formed with a square cross section at the ends. These fit holes with corresponding shape in the rotation device and the hub 39, respectively, and the shaft can thus transfer a relatively large torque. The sleeve 31 is provided with a bearing 40 in order to decrease the friction to the shaft, and a box type sealing 41 preventing leakage between the sleeve and the shaft. The box type sealing is held compressed with the help of a gland 42, which in turn is attached with the screw joint 43 as shown in FIG. 4.

The casing limiting the valve house in a radial direction consists of a cylindrical shell 44 and two flange rings 45, which are pressure-tightly joined to each other by for example welding. Each flange ring is formed with a groove in the surface facing the adjacent end plate, and in the groove a sealing ring 46 is located. When the back flushing valve is mounted the screw joint 10 holds the end plates 7 and 8 pressed against the casing, which means that the sealing rings will be compressed and thus may seal between the end plates and the flange rings.

Figure 10:
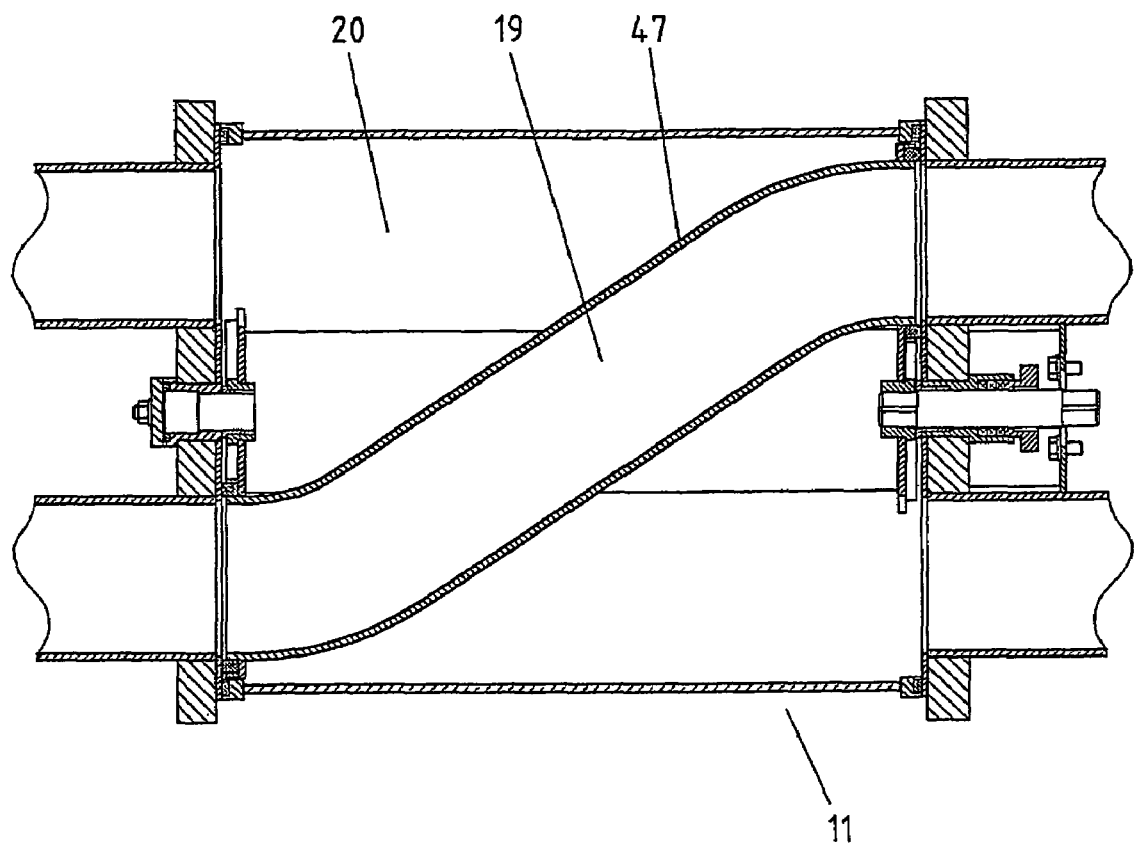
FIG. 10 shows a cross section along the line I—I through the back flushing valve in FIG. 6, with the valve body in a back flushing position.

FIG. 10 is identical with FIG. 7 apart from the valve body being rotated 90° around its rotary axis. With the valve body in this position, the section I—I intersects the flow passages 19 and 20 along their length. The flow passage 19 is limited by a double-bended pipe 47. The flow passage 20 is limited by the valve house 11 and the respective wall around the three flow passages 17–19, that is, the flow passage 20 is constituted by the entire space in the valve house, which is not occupied by the flow passages 17–19.

Figure 11:
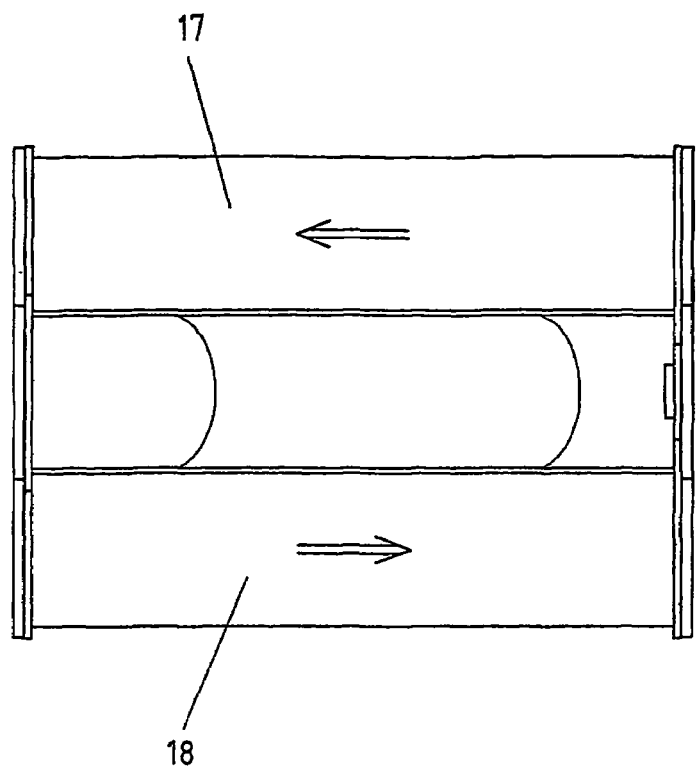
FIG. 11 shows a view of the valve body in the same position as in FIG. 7.

In FIG. 11 the valve body is shown in the same position as in FIG. 7, but is here not in section. The arrows indicate thought flows through the back flushing valve to and from a heat exchanger, respectively, when it is in a preferred normal position.

Figure 12:
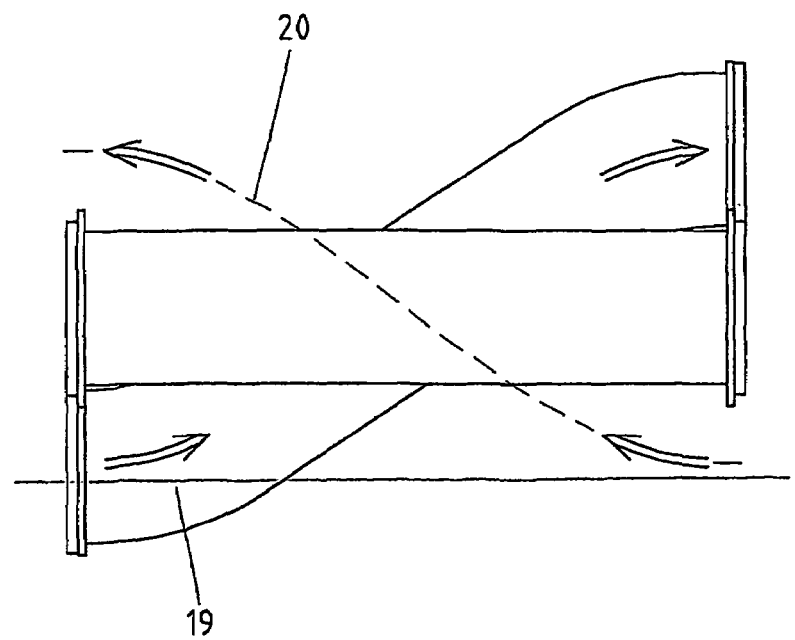
FIG. 12 shows a view of the valve body in the same position as in FIG. 10.

In a corresponding way FIG. 12 shows the valve body in FIG. 10. If the lower arrow in FIG. 11 indicates a flow to a heat exchanger and the upper arrow the flow from, the flows through the back flushing valve will in a preferred back flushing position have directions according to the arrows in FIG. 12. The flow to the heat exchanger flows through the flow passage 19, and the flow from the heat exchanger flows through the flow passage 20, which is limited by the valve house 11 and the respective wall around the three flow passages 17–19.

By configuring the valve with three tubular flow passages and using the space outside them to the fourth flow passage, the entire valve will be flushed by the fluid during operation and the risk of accumulation of dirt in the valve will be eliminated.

Figure 13:
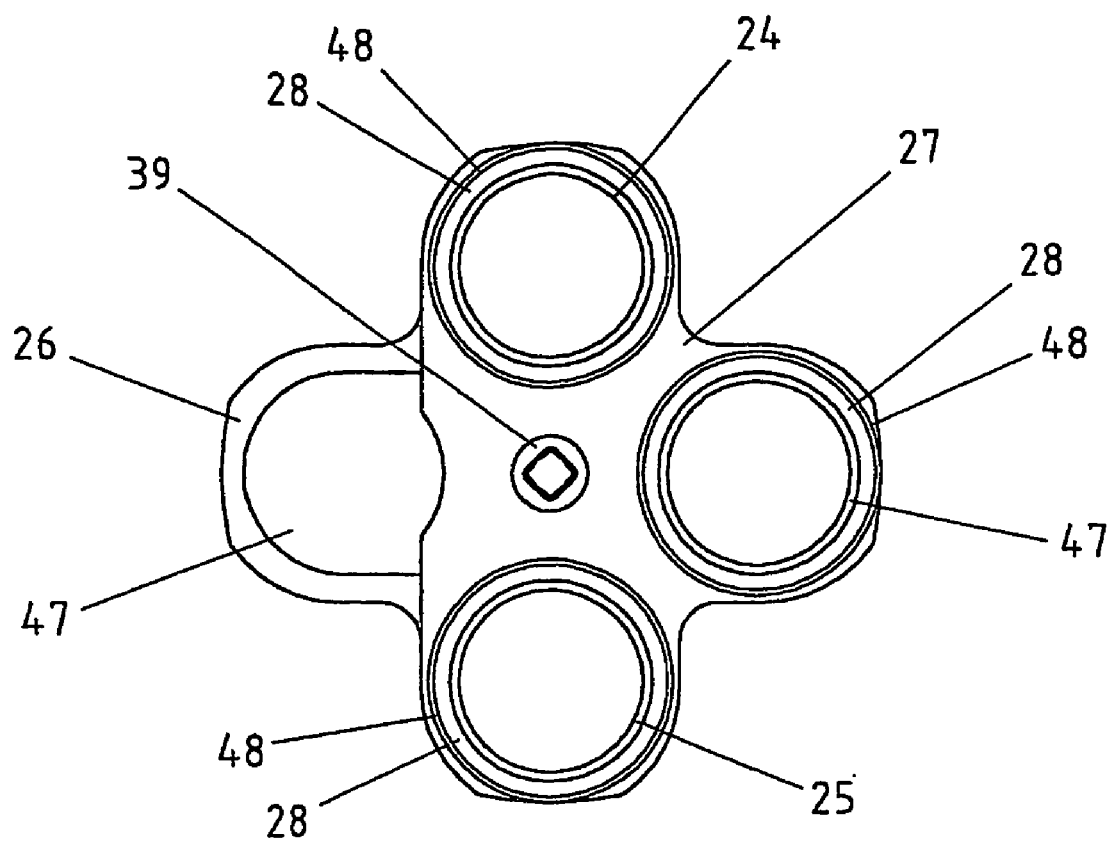
FIG. 13 shows a view of the right end of the valve body in FIG. 11.

FIG. 13 shows the end plate 27 and the three pipes 24, 25 and 47, and three support rings 48 concentrically positioned around the respective pipe. Between the pipes and the support rings grooves are formed, in which the sealings 28 are mounted.

From FIGS. 11, 12 and 13 it is evident that the three pipes 24, 25 and 47 are formed with a circular cross section along the whole length of the respective pipe, which means that the valve body may be manufactured with standardised pipe components. Thus expensive tools for manufacturing the pipes are avoided.

Since the flow passage 20 is constituted of the entire space in the valve house, which is not taken up by the flow passages 17–19, the corresponding flow path has a cross section area which is considerably larger than the connected connection pipes. In order to decrease the pressure drop when the fluid flows from a connecting pipe into the flow passage 20, the valve body may be provided with an expansion nozzle right in front of the connection port where the fluid is flowing in. The expansion nozzle is preferably shaped by a sheet into a tubular device with a successively increasing cross section area.

The connection pipes on the back flushing valve shown are shown without flanges or other types of pipe connections but they can of course be provided with such connections. The embodiment shown allows the back flushing valve to be taken apart for maintenance when it is mounted to connecting pipe conduits, which means that the connection pipes and pipe conduits can be joined permanently for example by welding, without causing any inconvenience during maintenance work.

In the embodiments of the back flushing valve described above metal is preferably used for most of the components but other materials such as for example reinforced plastics can also be used if the construction is modified.

The invention claimed is:

1. A valve for changing the direction of flow of a fluid in pipe conduits conducting the fluid to and from a heat exchanger, respectively, said valve comprising a rotatable valve body and an enclosing valve house comprising a cylindrical casing with end plates, wherein said valve body is rotatable around a rotary axis coinciding with a thought centre line of the cylindrical casing, and four flow passages extending through the valve house and being oriented in such a way that two diametrically positioned flow passages are approximately parallel with the rotary axis of the valve body and that the two other flow passages extend obliquely through the valve house, and when the valve body is turned into a first position the flow passages connect a first connection port in the first end plate with a first connection port in the second end plate, and a second connection port in the first end plate with a second connection port in the second end plate, respectively and, when the valve body is turned into a second position, the flow passages connect the first connection port in the first end plate with a second connection port in the second end plate, and the second connection port in the first end plate with the first connection port in the second end plate, respectively wherein the valve body comprises three tubular flow passages and wherein the remaining flow passage is constituted by the space between the valve house and the respective walls around the three flow passages in the valve body.

2. The valve according to claim 1, wherein the valve house has two plane and essentially evenly thick end plates, each of which has two diametrically positioned connection ports, positioned in such a way that the connection ports in one end plate are approximately aligned with the connection ports in the second end plate.

3. The valve according to claim 1, wherein the valve house comprises a cylindrical casing and two removable end plates, and that the end plates are held attached to the casing with a screw joint along the outer rims of the end plates.

4. The valve according to claim 3, wherein a screw joint extends between the end plates in such a way that they are pressed against the casing during tightening of said screw joint.

5. The valve according to claim 1, wherein the cylindrical casing has at least one permanently mounted end plate.

6. The valve according to claim 1, wherein at least one end plate has a protruding pipe concentrically positioned around one of the connection ports, and that the pipe is parallel with the rotary axis of the valve body.

7. Use of a valve according to claim 1, wherein the valve is intended to turn the direction of the flow of a fluid in a heat exchanger.

* * * * *